R. L. DOWNTON.
Process of Manufacturing Flour.
No. 204,302. Patented May 28, 1878.
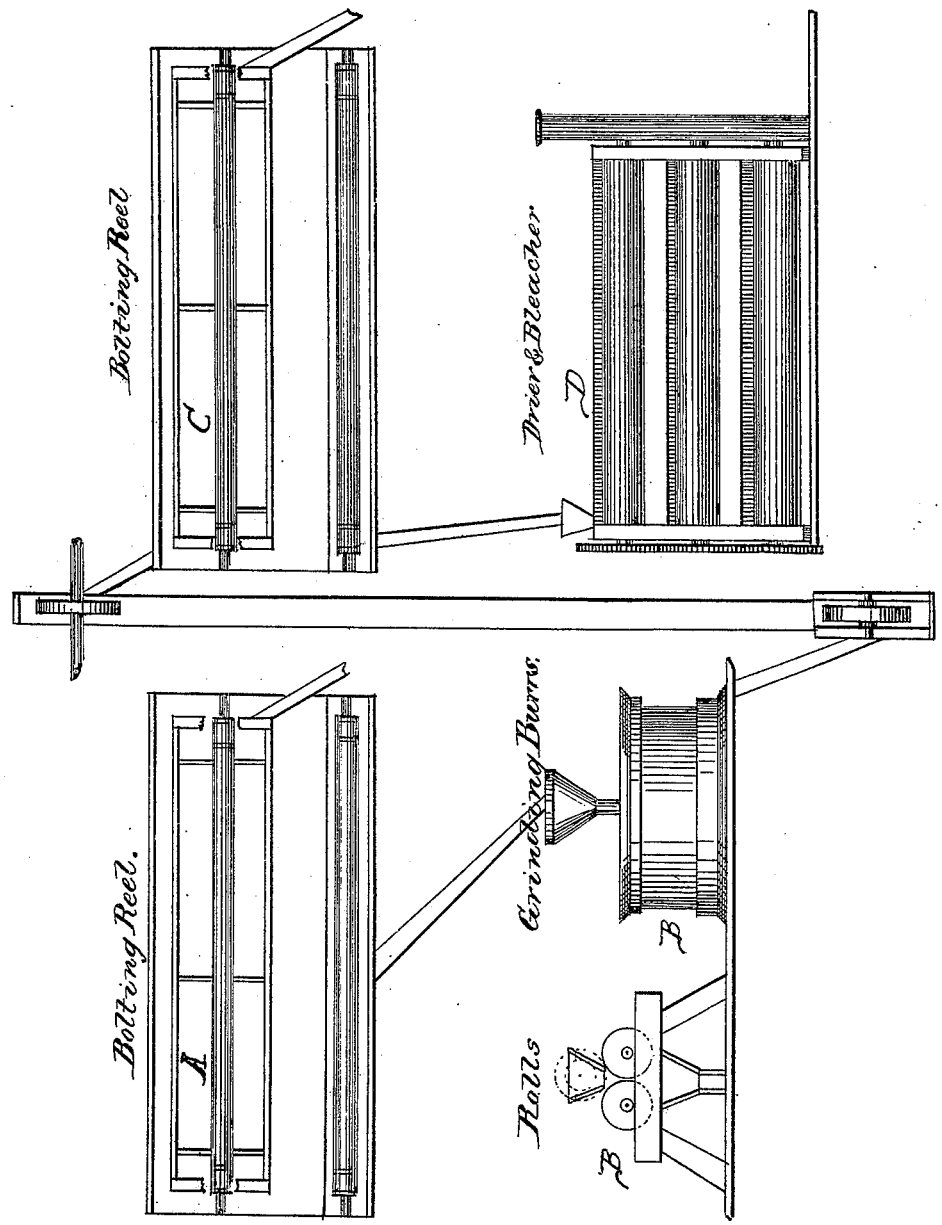

UNITED STATES PATENT OFFICE.

ROBERT L. DOWNTON, OF MILWAUKEE, WISCONSIN.

IMPROVEMENT IN PROCESSES OF MANUFACTURING FLOUR.

Specification forming part of Letters Patent No. 204,302, dated May 28, 1878; application filed August 22, 1876.

*To all whom it may concern:*

Be it known that I, ROBERT L. DOWNTON, of the city of Milwaukee and State of Wisconsin, have invented certain new and useful Improvements in the Process of Manufacturing Flour, of which the following is a full, clear, and exact description.

This invention has for its object the manufacturing of a better grade of flour from certain portions of the wheat-berry.

To more clearly define my invention it will be necessary to describe the present method of manufacturing middlings-flour. The ground meal is thrown into bolts covered with cloths of different degrees of fineness, the superfine or starchy flour passing through the finest or first division of cloth, the middlings passing through the second or next finest division of cloth, and the bran passing through the third or still coarser division of cloth. The middlings are then transferred to a purifier having an upward current of air, where the detached particles of bran and other impurities are thus removed. The middlings, however, contain flat scaly particles, (technically termed "dustings,") larger than the superfine or starchy flour before alluded to, and not sufficiently large or granulated to admit of purification by the ordinary methods, and which, when ground with the middlings, tend to discolor the flour produced therefrom. My invention, therefore, relates to a separate treatment of this material in order to obtain the best results; and the invention consists in separating from the middlings before they are transferred to the purifier this material termed "dustings," by passing the middlings through a bolt clothed with cloth of such fineness as to readily allow said particles termed "dustings" to be bolted through the cloth, while the middlings pass over the tail of the bolt. The material passing or bolted through the cloth is then reground and rewhitened by passing it through or between burrs or rolls, and then bolted through a reel or reels clothed with finer cloths than it last came through, while the small specks (separated therefrom by the action of the burrs or rolls, and which tend to discolor the flour,) are carried over the tail of the reel or reels. The flour passing through the last reel or reels is then conveyed to driers or bleachers, where it is subjected to radiated heat, which gives it a dry sharp feeling and evaporates the discoloring moisture, which especially pertains to this class of material. This flour can be mixed with the other flour, or be sold as a separate grade of flour.

I will now describe briefly my process of manufacturing flour, referring, for illustration, to the accompanying drawing.

A represents the reel, to which the middlings are transferred before they go to the purifier, the material termed "dustings" being separated and bolted through the reel, while the middlings pass over the tail of the reel. The material termed "dustings" is then conveyed to the grinding burrs or rolls B to be reground and rewhitened, thence to the bolting-reel C, clothed with finer cloth than reel A, through which the flour is bolted, the fine specks separated therefrom by the burrs or rolls passing over the tail of the reel. The flour bolted through said reel is then conveyed to the drier or bleacher D, where it is subjected to radiated heat, producing the results before described.

Separating this material termed "dustings" from the middlings, then regrinding and rewhitening and rebolting on finer cloths, is of considerable value, but when dried and bleached it is of still more importance.

I claim as my invention—

The herein-described process of manufacturing flour, consisting of an intermediate separation of the material termed "dustings" from the middlings previous to the purification of said middlings, and then subjecting said dustings to the action of rolls or burrs for regrinding and rewhitening the same, and subsequently rebolting said material on finer cloths, substantially as specified.

ROBERT LUCAS DOWNTON.

Witnesses:
W. H. WATSON,
HENRY CROSSON.